United States Patent
Gilley et al.

(10) Patent No.: US 9,514,355 B2
(45) Date of Patent: Dec. 6, 2016

(54) ORGANIZING IMAGES BY CORRELATING FACES

(75) Inventors: Greg Gilley, Los Altos, CA (US);
Joshua David Fagans, Redwood City, CA (US); Nikhil Bhatt, Cupertino, CA (US); Jeff Albouze, Boulder Creek, CA (US); Simeon Leifer, Santa Clara, CA (US); Timothy B. Martin, Sunnyvale, CA (US); Gregory Charles Lindley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1995 days.

(21) Appl. No.: 12/567,541

(22) Filed: Sep. 25, 2009

(65) Prior Publication Data

US 2010/0172551 A1   Jul. 8, 2010

Related U.S. Application Data

(63) Continuation-in-part of application No. 12/436,069, filed on May 5, 2009.

(60) Provisional application No. 61/142,606, filed on Jan. 5, 2009.

(51) Int. Cl.
  *G06K 9/00*  (2006.01)
(52) U.S. Cl.
  CPC .................. *G06K 9/00288* (2013.01)
(58) Field of Classification Search
  None
  See application file for complete search history.

(56) References Cited

U.S. PATENT DOCUMENTS

| | | | |
|---|---|---|---|
| 5,450,504 A * | 9/1995 | Calia | 382/118 |
| 6,940,545 B1 | 9/2005 | Ray et al. | |
| 6,965,693 B1 * | 11/2005 | Kondo et al. | 382/190 |
| 7,190,829 B2 | 3/2007 | Zhang et al. | |
| 7,916,905 B2 | 3/2011 | Yen et al. | |

(Continued)

FOREIGN PATENT DOCUMENTS

| | | |
|---|---|---|
| CN | 101324954 A | 12/2008 |
| EP | 1128316 | 8/2001 |

(Continued)

OTHER PUBLICATIONS

Authorized Officer Brigitte Chiarizia, International Search Report/Written Opinion in PCT/US2010/020040 mailed Jun. 29, 2010, 20 pages.

(Continued)

*Primary Examiner* — Aaron W Carter
(74) *Attorney, Agent, or Firm* — Blank Rome LLP

(57) ABSTRACT

Methods and systems are presented for organizing images. In one aspect, a method can include generating a correlation value indicating a likelihood that a face included in a test image corresponds to a face associated with a base image, determining that a correlation threshold exceeds the correlation value and that the correlation value exceeds a non-correlation threshold, generating a similarity score based on one or more exposure values and one or more color distribution values corresponding to the test image and the base image, combining the similarity score with the correlation value to generate a weighted correlation value, and determining that the test image and the base image are correlated when the weighted correlation value exceeds the correlation threshold.

6 Claims, 16 Drawing Sheets

(56) References Cited

U.S. PATENT DOCUMENTS

| | | |
|---|---|---|
| 7,929,771 B2 | 4/2011 | Ko et al. |
| 2003/0179911 A1 | 9/2003 | Ho et al. |
| 2003/0198368 A1* | 10/2003 | Kee .............................. 382/118 |
| 2004/0264780 A1 | 12/2004 | Zhang et al. |
| 2005/0031173 A1 | 2/2005 | Hwang |
| 2006/0029265 A1 | 2/2006 | Kim et al. |
| 2006/0204034 A1 | 9/2006 | Steinberg et al. |
| 2006/0222217 A1* | 10/2006 | Kitamura et al. ............ 382/118 |
| 2007/0110305 A1* | 5/2007 | Corcoran et al. ............. 382/167 |
| 2008/0056580 A1 | 3/2008 | Okada et al. |
| 2008/0122944 A1* | 5/2008 | Zhang ........................ 348/222.1 |
| 2008/0220750 A1 | 9/2008 | Steinberg et al. |
| 2008/0298766 A1 | 12/2008 | Wen et al. |

FOREIGN PATENT DOCUMENTS

| | | |
|---|---|---|
| EP | 1128316 A1 | 8/2001 |
| JP | 2006072614 A | 3/2006 |
| JP | 2008117271 A | 5/2008 |
| WO | 2008109622 A1 | 9/2008 |

OTHER PUBLICATIONS

Authorized Officer Brigitte Chiarizia, International Search Report/Written Opinion in PCT/US2010/020141 mailed Mar. 29, 2010, 26 pages.

Jin et al, "Face detection using template matching and skin-color information" Neurocomputing, Elsevier Science Publishers, Amsterdman, NL, vol. 70, No. 4-6, Jan. 9, 2007 (Jan. 9, 2007), 794-800, XP005824874, ISSN: 0925-2312, the whole document.

Final Office Action received in corresponding JP Application No. 2011-544642, dated Apr. 17, 2013.

\* cited by examiner

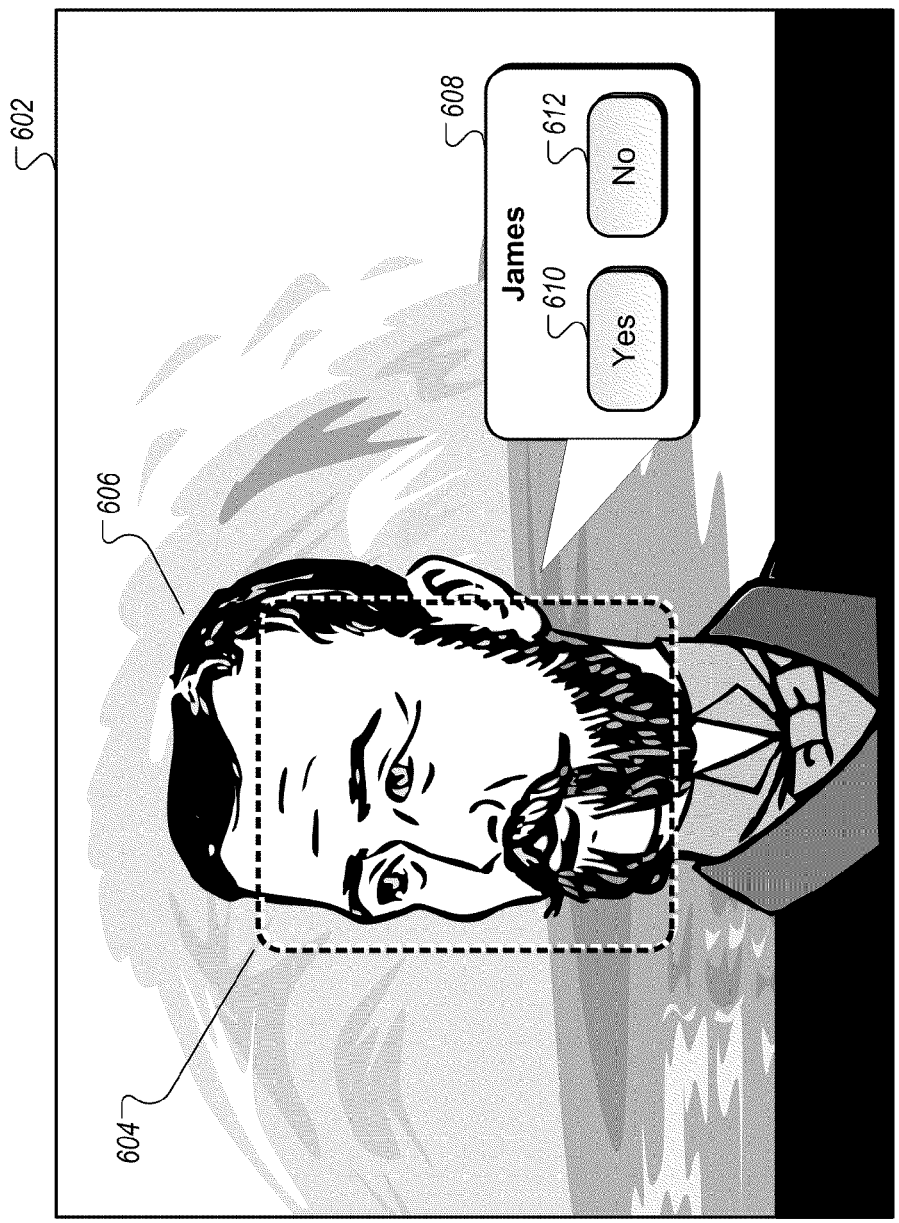

ORGANIZING IMAGES BY CORRELATING FACES

This application is a continuation-in-part of U.S. patent application Ser. No. 12/436,069, filed on May 5, 2009, entitled "Organizing Images By Correlating Faces," and also claims the benefit of U.S. Provisional Application No. 61/142,606, filed Jan. 5, 2009, entitled "Organizing Digital Images By Correlating Graphical Faces," the disclosures of which are considered part of and are incorporated by reference in the disclosure of this application.

TECHNICAL FIELD

The present disclosure relates to organizing images, such as digital images, by correlating one or more faces represented in the images.

BACKGROUND

Photography is a popular pastime. Images, including digital images produced through digital photography, are prevalent. Images also can be produced by graphical editing software (e.g., image editing or drawing software), video equipment, rendering systems, scanners, tomography scanners, and radio telescopes.

Images often represent people and, in particular, the faces of people. Facial detection relates to determining whether images represent one or more faces. Facial recognition (or recognition) relates to identifying a person represented in an image. Recognition can be accomplished by comparing selected facial features from a graphical face to a facial database. Facial recognition algorithms can identify faces by extracting landmarks corresponding to facial features from the image. For example, an algorithm may analyze the relative position, size, and shape of the eyes, nose, cheekbones, and jaw. Recognition algorithms include eigenface, fisherface, the Hidden Markov model, and neuronal motivated dynamic link matching.

SUMMARY

This disclosure describes technologies and techniques for organizing images, such as digital images, by correlating faces represented in images.

Systems implementing techniques described here enable users to organize images such as media stored on a computer-readable storage device. Images can be automatically assigned to a particular storage location, logically and/or physically, based on the correlation of one or more faces appearing in the media. For example, an album corresponding to a particular individual can be automatically populated with digital images that represent that individual. The degree to which the images included in an album must be correlated can be varied, such as based on user specifications.

In general, in one aspect, the disclosed techniques can be implemented to include generating a correlation value indicating a likelihood that a face included in a test image corresponds to a face associated with a base image, determining that a correlation threshold exceeds the correlation value and that the correlation value exceeds a non-correlation threshold, generating a similarity score based on one or more exposure values and one or more color distribution values corresponding to the test image and the base image, combining the similarity score with the correlation value to generate a weighted correlation value, and determining that the test image and the base image are correlated when the weighted correlation value exceeds the correlation threshold.

The techniques also can be implemented to include determining an elapsed time between the base image and the test image and computing the similarity score when the elapsed time does not exceed a time threshold. Further, the techniques can be implemented to include determining the elapsed time based on time and date metadata associated with the base image and the test image. Additionally, the techniques can be implemented such that generating a similarity score further includes assigning a weighting factor to at least one of the one or more exposure values and one or more color distribution values.

The techniques also can be implemented such that the correlation threshold comprises a static value. Further, the techniques can be implemented such that wherein generating a similarity score further includes adjusting the similarity score based on an elapsed time between the base image and the test image. Also, the techniques can be implemented to include determining that the base image and the test image include multiple faces and computing a color distribution comparison between a corresponding face region of the base image and the test image for use in generating the similarity score. Additionally, the techniques can be implemented to include determining that a correlation between the base image and the test image represents a forbidden association and prohibiting the correlation.

In general, in another aspect, the techniques can be implemented to include presenting an image in a user interface, receiving user input identifying a face region in the image depicting a face that was not automatically detected, altering one or more facial detection criteria, and performing a facial detection process for the identified face region using the altered facial detection criteria.

The techniques also can be implemented to include receiving user input identifying the face region through a graphical user interface. Further, the techniques can be implemented such that altering one or more facial detection criteria further includes suspending the application of one or more facial detection criteria.

The techniques also can be implemented such that altering one or more facial detection criteria further includes reducing a value associated with a facial detection criterion by a predetermined amount. Further, the techniques can be implemented to include determining that a face was not detected in the identified face region by the facial detection process and repeating the facial detection process with incrementally reduced facial detection criteria until a face is detected in the identified face region. Additionally, the techniques can be implemented such that the facial detection criteria comprise one or more of a sharpness value, a skin-tone value, and a head-tilt angle.

Other implementations of this aspect include corresponding systems, apparatus, and computer programs, configured to perform the actions of the methods, encoded on computer storage devices.

The techniques described in this specification can be implemented to realize one or more of the following potential advantages. Correlating faces can be implemented to permit automatically sorting images into one or more storage structures, such as folders or albums. Further, the subject matter can be implemented to permit identifying new individuals for whom a graphical face definition or profile has not been defined. Additionally, the subject matter can be implemented to permit refining the criteria used to correlate faces, such as a definition or profile, based on the association of additional images with an individual.

Organizing images by the people represented in the media provides several potential advantages. For example, such an organizational scheme can be intuitive for users of an image system, enabling users to quickly understand the functioning of the system. Further, the burden of manually organizing many images can be substantially eliminated or reduced. In addition, images can be accurately grouped based on a person represented in the images. Accurately grouping images can provide improved accessibility, organization and usability of the images by users.

The details of one or more implementations are set forth in the accompanying drawings and the description below. Other features and advantages will be apparent from the description and drawings, and from the claims.

BRIEF DESCRIPTION OF THE DRAWINGS

FIG. 6A is a diagram of an exemplary user interface for receiving user input.

Like reference symbols indicate like elements throughout the specification and drawings.

DETAILED DESCRIPTION

Figure 1:
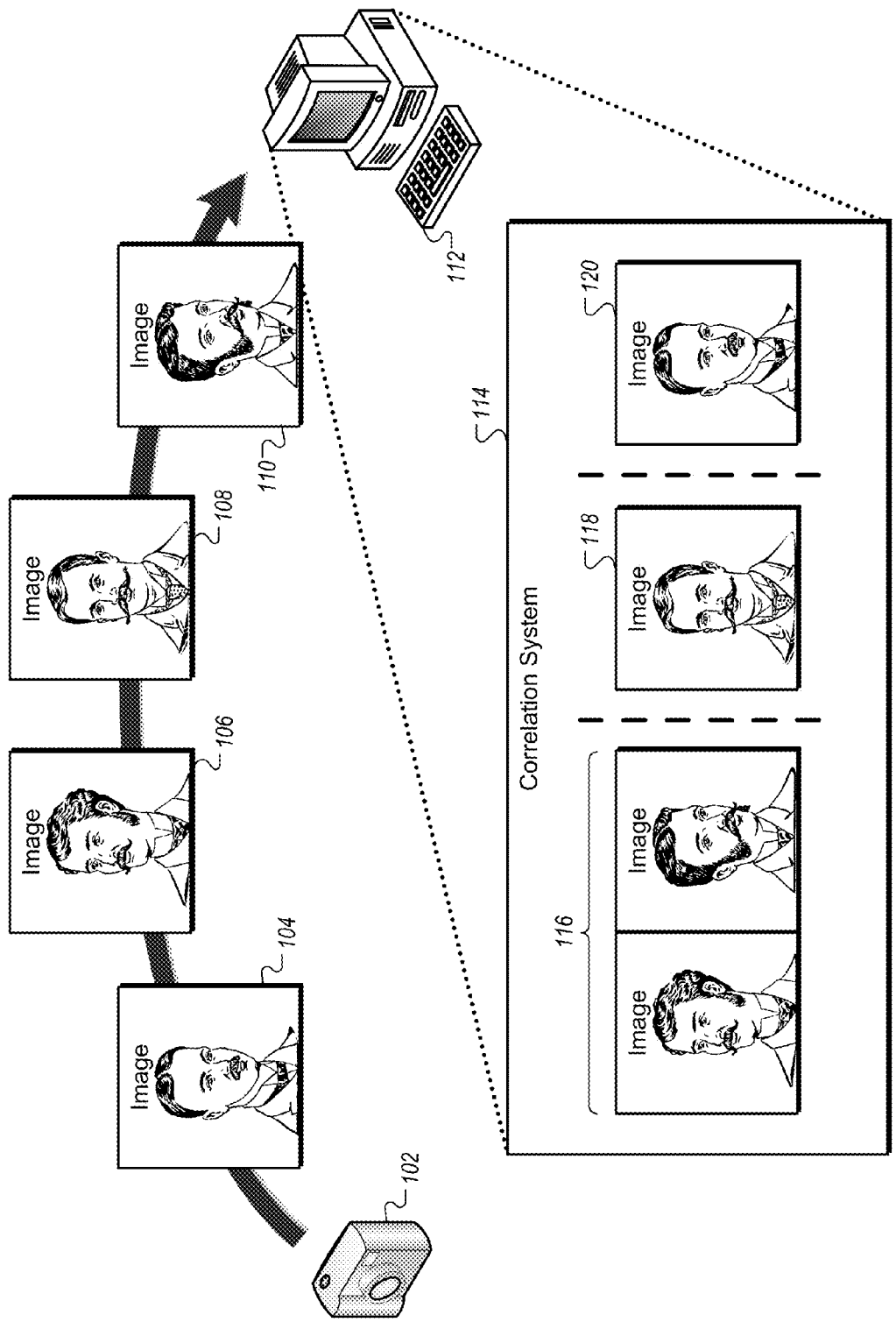
FIG. 1 shows an exemplary overview of correlating graphical faces.

Organizing images by correlating faces includes associating representations of the same person across images. FIG. 1 shows an exemplary overview of correlating graphical faces. In general, images can be transmitted from a camera to a computer. The computer can include a correlation system. The correlation system can correlate the images by grouping images of the same individual.

Digital camera 102 is a camera for capturing digital images. The digital camera 102 can capture video or still images, or both, by recording images via an electronic image sensor. The digital camera 102 can be a stand-alone digital camera or can be incorporated into any of several devices. For example, the digital camera 102 can be incorporated into a personal digital assistant (PDA), a mobile phone, or a web cam. Further, the digital camera 102 can utilize removable storage media to store captured image data. For example, the digital camera 102 can store images in a removable flash memory device (e.g., CompactFlash and Secure Digital cards). The digital camera 102 can record images in various formats, e.g., raw format or in accordance with the standard of the joint photographic experts group (JPEG). The digital camera 102 also can include one or more interfaces for communicating with a computer. For example, the digital camera 102 can include a wired interface, such as universal serial bus (USB) or FireWire, and/or a wireless interface, such as infrared or radio frequency.

The image 104 is a digital image produced by a digital camera (e.g., the digital camera 102). The image 104 represents a face. The image 104 also can include representations of other items. For example, the image 104 can be an image of a person standing in front of a landmark, and can represent buildings, trees, the sky, etc. Further, the image 104 can be stored in various formats, such as a compressed format (e.g., JPEG), or an uncompressed format (e.g., RAW). The image 104 can include graphical data and metadata. The metadata can conform to the exchangeable image file format (Exif) specification. The Exif data can include aperture, exposure time, date and time, location and other information about the image 104.

The digital camera 102 can capture images. For example, the images 106, 108, and 110 can be other images like the image 104. Each of the images 106, 108, and 110 also can represent a graphical face.

The computer system 112 can be configured to receive images transferred from a digital camera, such as the digital camera 102. The computer system 112 can be a computer (e.g., a desktop, a laptop, a server, etc.), a mobile telephone (e.g., a Blackberry), a PDA, or other such device. The computer system 112 can include hardware configured to execute one or more software applications. Further, the computer system 112 can include electronic storage media, such as random access memory (RAM), flash memory, and a hard drive. Additionally, the computer system 112 can include one or more communications interfaces capable of receiving digital information, such as images. The one or more communications interfaces can be wired or wireless.

The correlation system 114 can be configured to correlate graphical faces represented in images. The correlation system 114 can be implemented in software executing on a computer system (e.g., the computer system 112), hardware included in the computer system, or a combination thereof. The correlation system 114 can access images (e.g., digital images), analyze data associated with the images, and correlate two or more images determined to represent a common graphical face. For example, digital images can be analyzed and images including a face corresponding to the same person can be associated with one another to form an image group.

The correlation system 114 can process the images 104, 106, 108, and 110, and generate one or more image groups. The image group 116 includes digital images, where each of the digital images represents a face corresponding to the same individual. An image group, such as the image group 116 can be a very large group of images (e.g., hundreds or thousands of images), a small group of images (e.g., ones or tens of images), or even a single image. Further, the same image can belong to multiple image groups. For example, an image including a person named Jack and another person named Mary can be included both in an image group associated with Jack and a different image group associated with Mary.

The image group 118 includes only one image. The image group 118 may include only one image for a variety of reasons, such as because the individual is represented in only one image, the individual whose face appears in the image has not yet been defined in the correlation system 114, or because the individual in the image is not recognized as someone already defined in the correlation system 114. Similarly, the image group 120 also can include only one image.

In operation, the images 104, 106, 108, 110 can be transmitted from the camera 102 to the computer system 112. The correlation system 114 can run on the computer system 112 and process the images 104, 106, 108 and 110, such as in response to a command received from a user or automatically in response to the transmission of images. The correlation system 114 can determine that image 106 and image 110 represent faces corresponding to the same person, and thus group image 106 and image 110 together in image group 116. Image group 116 also can include images already stored on the computer system 112 that represent the same person. Further, the correlation system 114 may not recognize one or more faces in an image, such as image 104 and image 108, and thus can create image groups containing only a single image, such as image group 118 and image group 120. Images containing an unrecognized face can be referred to as singletons. In some implementations, the correlation system 114 can group some or all of the singletons in an image group.

Figure 2:
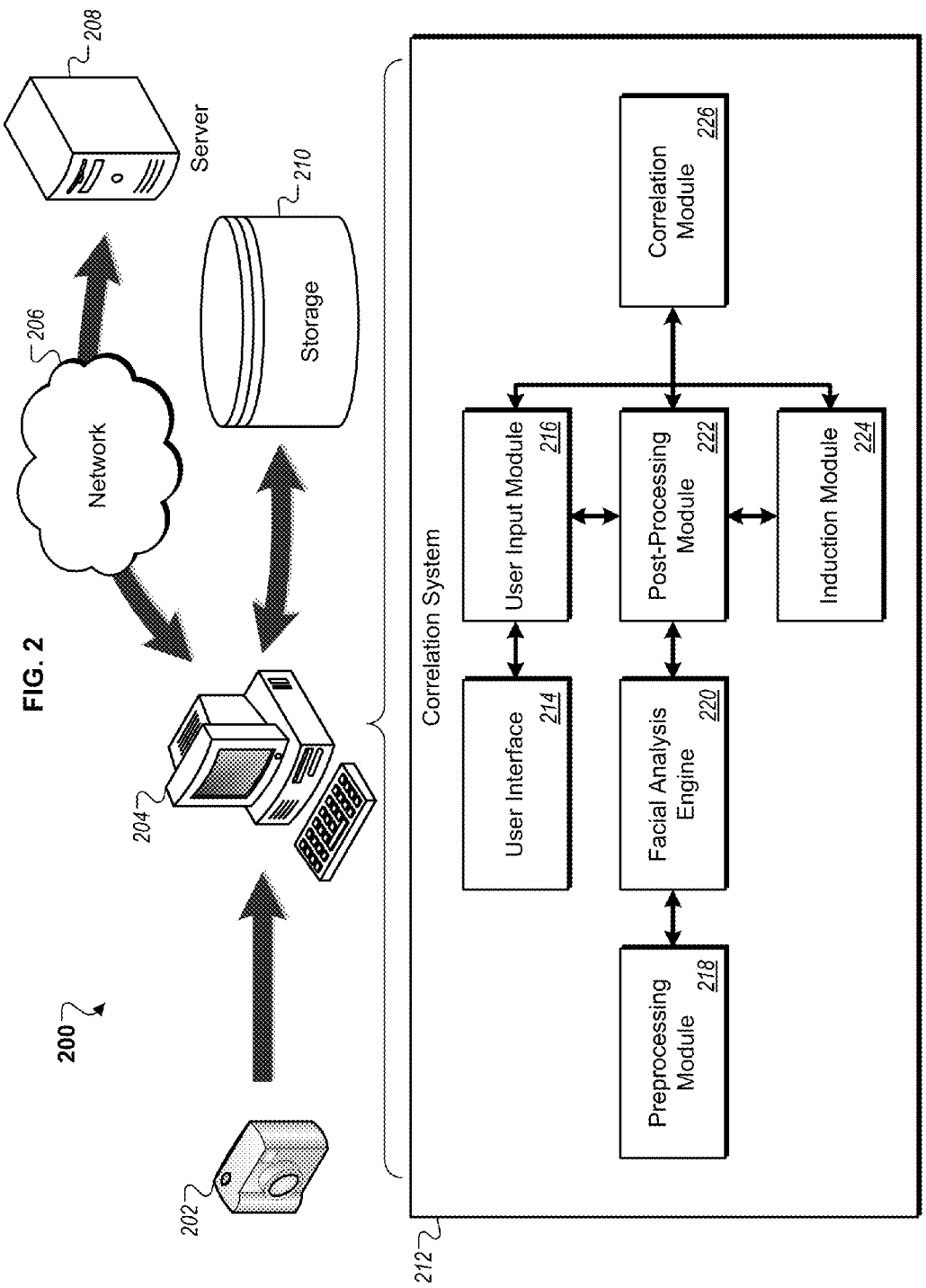
FIG. 2 shows an exemplary system for correlating graphical faces.

FIG. 2 shows an exemplary system 200 for correlating graphical faces represented in images. Correlating can involve various hardware and software components. Input, such as images and identification information, can be received and used to correlate faces represented in digital images. Further, the results of the correlating process can be iteratively improved by receiving additional input and performing additional correlation.

As shown in FIG. 2, the system 200 can include a digital camera 202. The digital camera 202 can be similar to the digital camera 102 in FIG. 1.

A computer system 204 can be similar to the computer system 112 in FIG. 1. In addition, the computer system 204 can include hardware and software to receive and transmit information over a network (e.g., the network 206). The computer system 204 also can be configured to transmit information to and receive information from a storage device (e.g., the storage 210).

A correlation system 212 can be configured to correlate faces appearing in digital images. The correlation system 212 can include software and/or hardware components. Further, the correlation system 212 can be a stand alone software application or can be implemented as part of a larger software application. The correlation system 212 can be configured to run in the background. Alternatively or additionally, the correlation system 212 can include a user interface 214 that enables a user to actively perform one or more management and/or processing functions.

The user interface 214 can be, e.g., a graphical user interface (GUI), a command line interface, a tactile interface, or a network interface for receiving input from a remote user. The user interface 214 can include mechanisms for input and output of commands and data, including digital images. For example, a user can input commands and other information to manipulate the correlation system 212. The user interface 214 also can output information to the user through one or more interface screens.

The user input module 216 can be configured to receive, store, and process input from an external source. For example, the user input module 216 can receive input from a user identifying a person in a digital image. The identification can be used subsequently in identifying other images of the same person. In addition, input can be received from other applications having relevant information. For example, data from an address book application can be used. The data can include images, names, email addresses, etc. The data can be used to seed the system with names. When a user is identifying people, the system can suggest names from the address book. Furthermore, the data can be used to seed the system with named faces. The data can include associations between names and faces. Advantageously, the data can be used to begin suggesting names to users before they have positively identified anyone (e.g., a user can have an image of a contact in an address book and the information can be used to suggest images representing the contact).

User input also can be received through a network 206 (e.g., the Internet) from a remote server 208 (e.g., a website). For example, if a user uploads images to a social network site (e.g., Facebook), the user and the user's friends can identify faces in the images. The identifications can be received as input and used in correlating images. Differing levels of confidence can be assigned to input received through the network (e.g., identifications by a user can be more confidently relied upon than identifications by the user's friends).

A preprocessing module 218 can be configured to process an image prior to passing the image to a facial analysis engine 220. The preprocessing module 218 can perform functions including applying rules and heuristics that can improve the performance of the facial analysis engine 220. For example, the preprocessing module 218 can apply a rule stating that an individual can only appear in an image once.

The facial analysis engine 220 can be configured to detect and recognize one or more faces represented in images. The facial analysis engine 220 can receive an image and settings, and can detect whether the image represents a face corresponding to a person. The settings can include parameters that affect the operation of the facial analysis engine 220, such as thresholds indicating, e.g., the level of confidence the facial analysis engine 220 should have about a detection before providing information about the detection (e.g., to the post-processing module 222).

Further, the facial analysis engine 220 also can correlate faces by comparing a graphical face to other graphical faces to determine if they belong to the same person. The facial analysis engine 220 can be configured to use algorithms such as eigenface or fisherface, or techniques such as a neural network to perform facial recognition. Additionally, the facial analysis engine 220 can be implemented as a library of facial analysis tools, such as the tools provided by OMRON Corp. of Schaumburg, Ill. in the OKAO Vision suite.

The post-processing module 222 can be configured to receive information from the facial analysis engine 220. Further, the post-processing module 222 can apply rules based on the input received from the engine 220 to improve the performance of the engine 220. For example, the post-processing module 222 can analyze an image to determine whether the portion of the image asserted by the facial analysis engine 220 to be a face includes a skin tone or appears sharp. If one or both of the conditions is failed, the module 222 can disregard the detection of a face. Skin tone and sharpness are discussed more fully below with respect to FIG. 4. Further, the module 222 can resubmit information to the engine 220 for processing again with new settings based on the post processing.

An induction module 224 can use inductive reasoning to make educated guesses as to whom a face may belong. For example, if the induction module 224 believes that two images represent the face of the same person (e.g., as received from the post-processing module 222), and a user identifies the person in one of the images (e.g., as received from the user input module 216), the induction module 224 can induce that the other image is also of the same person.

A correlation module 226 can be configured to use the information provided by one or more of the other modules included in the correlation system 212 to correlate faces appearing in digital images. The correlation process can include organizing images into groups based on the faces represented in the images. In particular, a group can be formed that contains all of the images accessible to the system that are known or believed to belong to a certain individual.

Figure 3A:
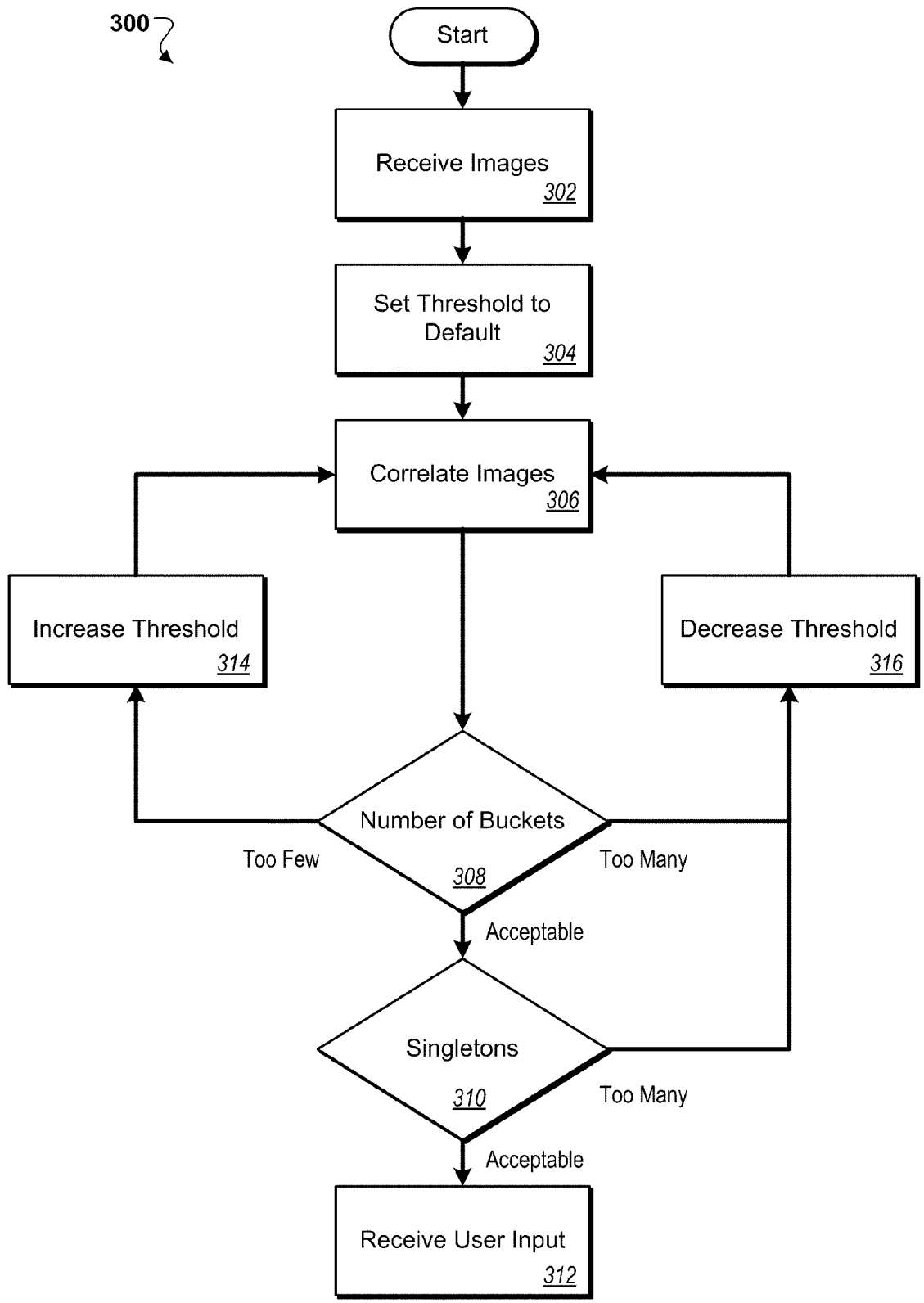
FIG. 3A is a flow chart showing an exemplary correlation process.

FIG. 3A is a flow chart showing an exemplary correlation process 300. The correlation process 300 iteratively adjusts a correlation threshold to produce an acceptable number of groups of images. The groups can be referred to as "buckets." Each bucket can contain one or more images believed to represent the same person. If the correlation threshold is set very high, the process 300 will not correlate two images unless it is virtually certain that the images represent the face of the same person. Thus, if the correlation threshold is set very high, more buckets with fewer images in each will be generated as some images of the same individual likely will not be correlated. If the correlation threshold is set very low, the process 300 can frequently correlate faces that may not correspond to the same person. Thus, setting the correlation threshold to a low value can produce fewer buckets with more images in each. However, the likelihood is increased that two images will be correlated that do not represent a face corresponding to the same individual. Ideally, a bucket will include as many images as possible of the same person and few or no images that do not represent that person.

Images representing faces can be received (302). Further, the threshold can be set to a default value (304). The default value can be an intermediate value. Once the default value has been set, images can be correlated, such that images believed to represent the face of the same person are associated with a single bucket (306). It then can be determined whether the number of buckets generated is acceptable (308). If the number of buckets is acceptable (e.g., there are not substantially as many buckets as images and not very few buckets relative to the number of images), the process 300 can determine whether too many singletons are remaining (310). Singletons can be images containing one or more faces for which the process 300 cannot identify a corresponding person. Having too many singletons can be a sign that the threshold value is set too high and that faces thus are not being correlated appropriately with other images containing faces of the same person.

If it is determined that there are too few buckets, the threshold value can be increased (314). Increasing the threshold value requires the process 300 to have additional confidence that faces in a bucket belong to the same person. Once the threshold value is increased, the process 300 once again performs correlation of the images (306).

If it is determined that there are too many buckets, the threshold value can be decreased (316). In addition, if the process 300, at 310, determines that there are too many singletons (e.g., indicating the degree of confidence required to assign an image to a bucket is too high), the threshold value also can be decreased (316). Decreasing the threshold value allows the process 300 to correlate images based on a lower degree of confidence. Once the threshold value is decreased, the process 300 once again performs correlation of the images (306).

If it is determined that there are an acceptable number of singletons (e.g., relative to the total number of images), the process 300 can continue by receiving user input (312). For example, the user input can include information about whose faces are represented in one or more images.

Figure 3B:
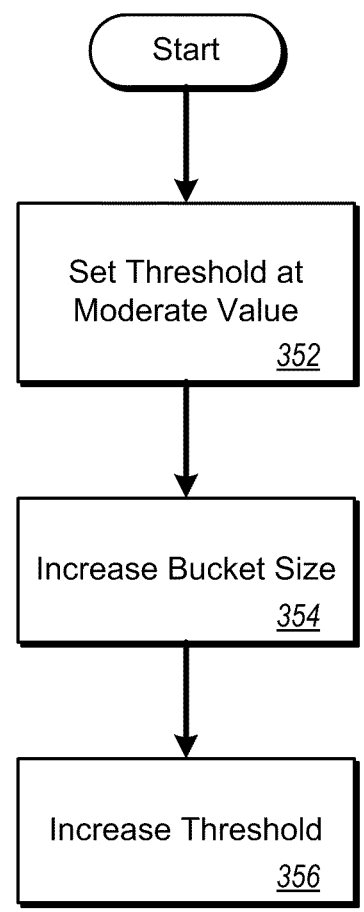
FIG. 3B is a flow chart showing an exemplary process for setting an adaptive correlation threshold.

FIG. 3B is a flow chart showing an exemplary process 350 for setting an adaptive correlation threshold. The correlation threshold can be automatically adjusted in response to one or more factors, including the number of images representing an individual's face that have been associated with a bucket. A threshold value for correlation confidence can be set on a per bucket basis. Initially, the correlation threshold can be set at a moderate value (352). For instance, the correlation threshold can be set to a value that will facilitate the identification of initial matches. As matches are made, the bucket size increases (354). For example, more images can be added to the bucket as new images are added to the system or more faces in images can be identified as representing a given individual, e.g., as the correlation process continues. Optionally, the user can confirm one or more matches or identify one or more incorrect matches. As the bucket size increases, the threshold can be increased (356) making correlating faces for the particular bucket more difficult (relative to a lower threshold). In some implementations, the correlation threshold for a bucket can be increased when a predetermined number of images that include a confirmed face, e.g. 10 or 20 images, have been added to that bucket. By increasing the correlation threshold, a stronger match is required to add an additional image to the corresponding bucket. The correlation threshold can be increased by any amount. Further, the correlation threshold can be iteratively increased, such as each time a predetermined number of images, e.g., 10 or 20, have been added to the bucket.

Figure 3C:
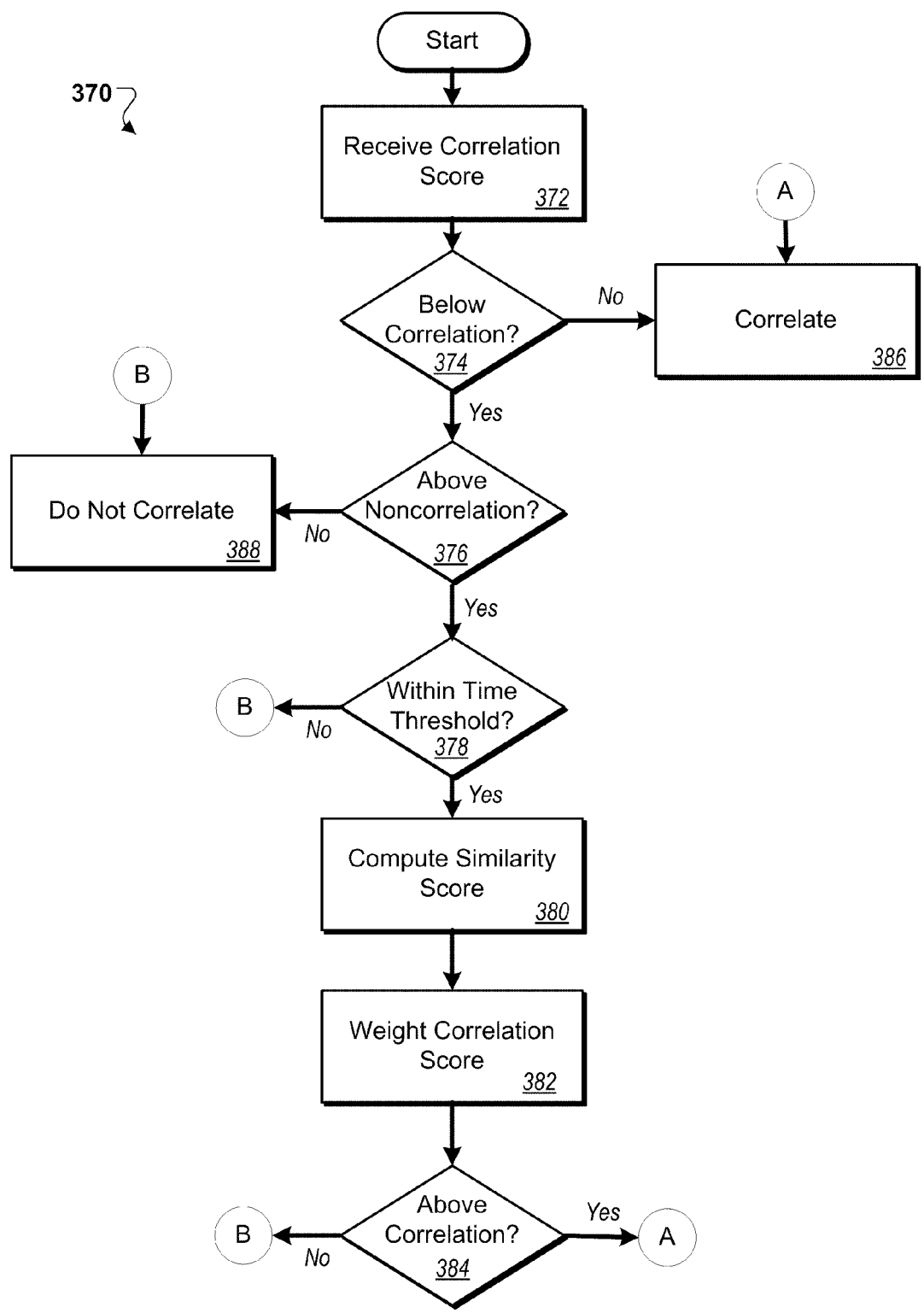
FIG. 3C is a flow chart showing an exemplary process for testing a recognition.

FIG. 3C is a flow chart showing an exemplary process 370 for testing an identified potential correlation. A correlation score representing an evaluation of a match between a test image and a base image, such as an image included in a bucket, can be received (372). The correlation score can be generated using any correlation process. The correlation score can be evaluated to determine whether it is below a predetermined correlation threshold (374). The correlation threshold can be static, such that the same correlation threshold value is used to evaluate each potential match, or dynamic, such that the correlation threshold can be adjusted to account for changes in the system performing the correlation, including the number of matches identified for one or more buckets and the number of buckets created. If the correlation score is above the correlation threshold, the test image can be correlated with the corresponding base image (386). Thus, the test image can be added to a collection including the base image.

Otherwise, if the correlation score is below the correlation threshold, it further can be determined whether the correlation score is above a predetermined noncorrelation threshold (376). The noncorrelation threshold can represent a value below which the test image cannot be associated with the corresponding base image. The noncorrelation threshold also can be static or dynamic. If the correlation score is below the noncorrelation threshold, the associated image will not be correlated with the base image and any corresponding collection (388). Alternatively, if the correlation score is above the noncorrelation threshold, the correlation score indicates a weak match and there remains a possibility that the test image can be correlated with the base image.

Meta data associated with the test image can be accessed to determine the time and date at which the test image was captured. The time and date associated with the test image further can be compared with the time and date of the base image to determine whether the elapsed time between capture of the images falls below a time threshold (378). In some implementations, a relatively short time threshold can be applied, such as one or two minutes. In some other implementations, a longer threshold can be applied, such as five or ten minutes. If the difference between the capture times of the test image and base image exceeds the time threshold, the test image is not correlated with the base image and any corresponding image collection (388). Alternatively, if the elapsed time between capture of the images is below the time threshold, a similarity score can be computed (380). In some implementations, time threshold can be eliminated and the elapsed time between capture can be used as a factor in generating the similarity score.

The similarity score can be computed using one or more factors characterizing the similarity of the test image to the base image. For example, the similarity score can be computed by comparing one or more exposure values and/or the color distribution (or histogram) of the test image and the base image. As the degree of similarity between the exposure values and/or color distribution increases, the similarity score also increases. The relationship between the similarity score on the one hand and the exposure values and/or color distribution on the other can be linear or non-linear. In some implementations, the similarity score also can include a measure of the elapsed time between the test image and the base image. As the elapsed time decreases, the value of the similarity score increases. The relationship between the elapsed time and the similarity score also can be linear or non-linear. Further, the relative weight of the factors, including the exposure values, the color distribution, and the elapsed time, with respect to the similarity score can vary in some implementations. In practice, two perfectly identical images captured a fraction of a second apart can produce a very high similarity score, while two somewhat similar images with a longer elapsed time between capture can produce a much lower similarity score.

In some implementations, one or more different criteria can be used to calculate a similarity score for a test image including multiple faces. For example, the color distribution of the entire image can be compared for a test image and a base image including only a single face. However, if multiple faces are present, the color distribution comparison can be limited to the face or face region being evaluated. Further, the degree of similarity required to produce a high similarity score can be increased if only a sub-region of an image is used for a comparison.

The similarity score can then be used to weight the correlation score (382). Thus, if the similarity score is high, the correlation score can be increased. If the correlation score is low, a higher similarity is required to sufficiently increase the correlation score to produce a positive correlation. On the other hand, if the correlation score is high, a moderate similarity score can be sufficient to produce a positive correlation. The correlation score, weighted by the similarity score, can be evaluated to determine whether it exceeds the correlation threshold (384). If the weighted correlation score does not exceed the correlation threshold, the test image will not be correlated with the base image (388). Alternatively, if the weighted correlation score exceeds the correlation threshold, the associated image can be correlated with the base image (386).

Figure 4A:
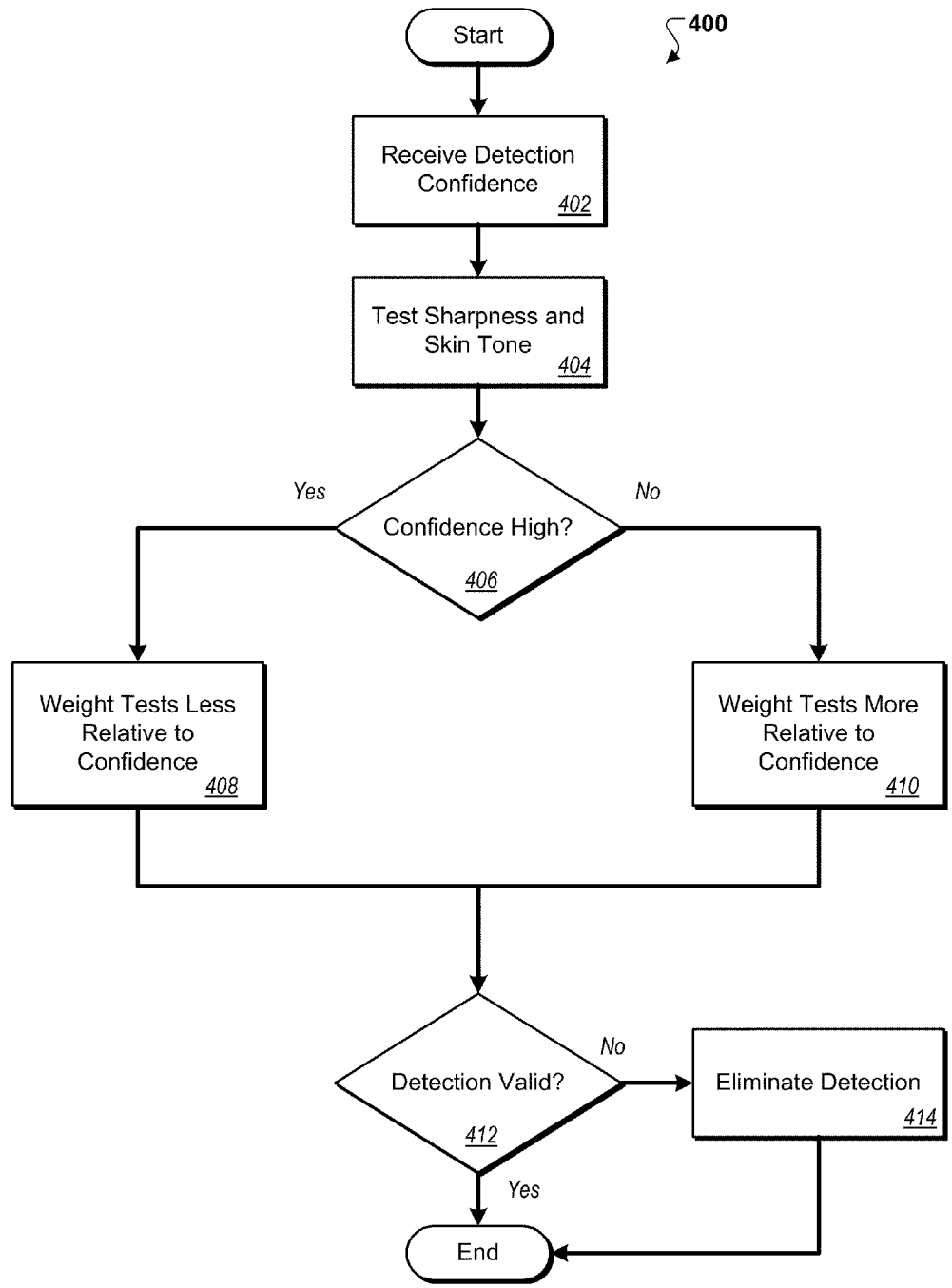
FIG. 4A is a flow chart showing an exemplary detection elimination process.

FIG. 4A is a flow chart showing an exemplary detection elimination process 400. In some instances, a detection engine detects an area of an image that supposedly represents a face (i.e., a detection) but which in actuality does not represent a face. The process 400 can eliminate such false-positive detections.

The detection elimination process 400 can be initiated by receiving a detection confidence (402). The detection confidence can be a value provided by an analysis engine indicating how confident the engine is about the detection actually being of a face.

The process 400 continues by testing the detection for sharpness and skin tone (404). Sharpness can include analyzing whether a face appears sharp in an image. Blurriness can result from a lack of either or both of actual or apparent sharpness. For example, a lack of actual sharpness can result from improper camera focus or movement of the camera or subject at the time a picture is taken. Apparent sharpness can refer to the acutance (i.e., edge contrast) of an image. Acutance is related to the amplitude of the derivative of brightness with respect to space. An image with higher acutance can appear sharper and be more appealing to a user even if the image does not have a higher resolution or actual sharpness than an image with lower acutance. Image processing techniques, such as unsharp masking, can increase the acutance in images but may at the same time decrease actual sharpness. Either or both of actual and apparent sharpness can be evaluated to determine whether the detection is blurry.

The process 400 also can determine whether the detection represents a potential skin tone (404). Skin tones can be colors corresponding to the range of human skin colors as determined, e.g., in images by the pigmentation of the subject, the lighting and the camera exposure. For example, a detection representing bright green hues is unlikely to correspond to a face.

The process 400 continues by determining whether the detection confidence is relatively high (406). The determination can be based on comparing a value representing the detection confidence with predetermined values. For example, 1000 can represent the highest confidence that a detection represents a face. It can be determined that confidence values higher than 800 are high.

If the detection confidence is high, the process 400 continues and in anticipation of an evaluation of whether the detection is valid (412), weighs the sharpness and skin tone tests less relative to the confidence (408). If the detection confidence is high, the process 400 continues and, again, anticipation of an evaluation of whether the detection is valid (412), weighs the sharpness and skin tone tests more relative to the confidence (410).

The process 400 continues by determining whether the detection is valid (412). The determination can be made based on the confidence value and results of the sharpness and skin tone tests. When the confidence value is determined to be high (406), the sharpness and skin tone tests can be weighted less (408) in the determination. In contrast, when the confidence value is determined to be low (406), the sharpness and skin tone tests can be weighted more (410) in the determination. Although the exemplary process 400 uses a binary determination with respect to the detection confidence being high (406), some implementations can proportionally factor in detection confidence and the results of graphical tests based on their relative values. The result can be a sliding scale in which the weight given to graphical tests depends on where the detection confidence lies on a scale from low to high (e.g., where at the highest confidence, the test are weighted very little relative to the confidence).

In addition to sharpness and skin tone tests, some implementations can use other factors in determining whether a detection is correct. For example, a detection engine may provide information about the angle at which the detected face appears relative to the image. If the image represents multiple faces, and one of the faces is upside down relative to the other faces, the upside down detection can be considered less likely to be valid. Other factors can influence the determination, such as circumstances that rarely occur given a correct detection.

The process 400 continues by eliminating a detection (414) determined to not be valid (412). Elimination can include, e.g., deleting the detection from memory, associating the detection with a suppression indication, or storing the detection in a list of false positives.

If the detection is determined to be valid (412) or after an invalid detection is eliminated (414), the process 400 ends.

Figure 4B:
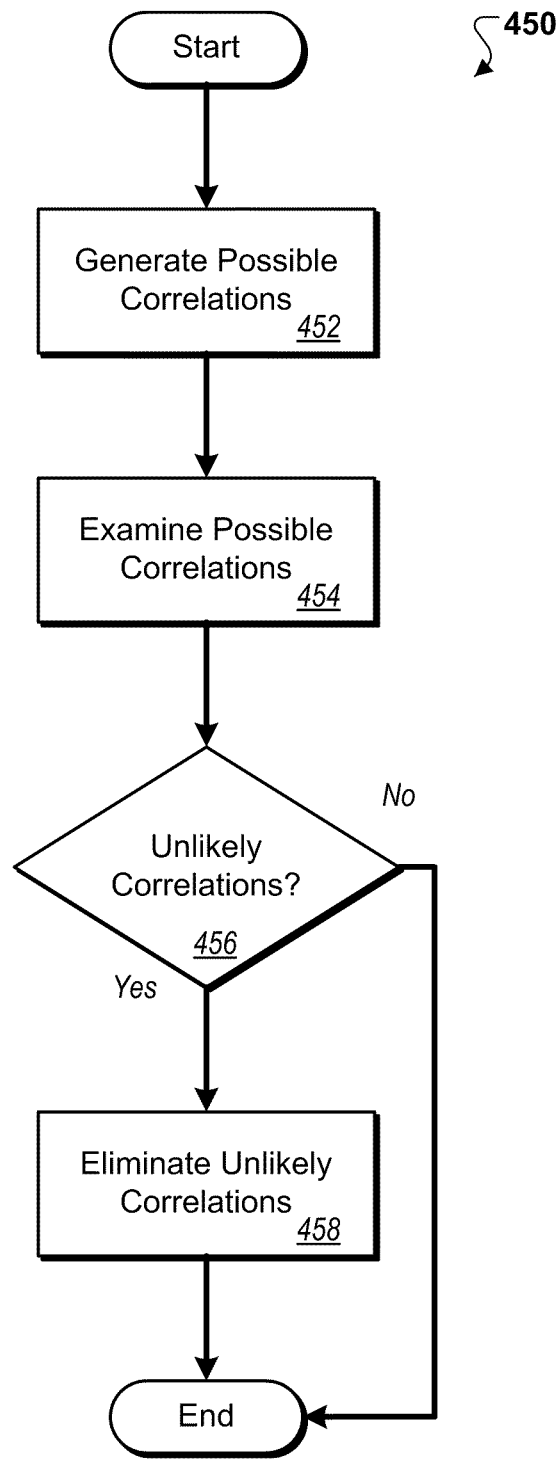
FIG. 4B is a flow chart showing an exemplary correlations elimination process.

FIG. 4B is a flow chart showing an exemplary correlation elimination process 450. An image can be correlated with one or more other images based on indications that the image represents a face corresponding to an individual that also appears in the one or more other images. Examining possible correlations can reveal situations that are unlikely to occur and thus can provide a basis for eliminating the possible correlations. Advantageously, eliminating possible correlations determined to be unlikely can improve the quality of information provided to users. For example, possible correlations can be identified in which two faces appearing in the same image correspond to the same individual. Since a single image rarely depicts two faces that correspond to the same individual, eliminating the less likely correlation, e.g., as determined by an identification confidence score, can result in eliminating a possible correlation that is likely to be invalid. Thus, the elimination can improve the accuracy of the correlations overall.

The correlations elimination process 450 can be initiated by generating possible correlations for faces (452). In general, correlating faces can include extracting features associated with an image that potentially identify a face. The features can then be compared to features of other faces to identify which faces likely correspond to the same person. In specific, correlating can include giving a same face key (e.g., unique identifier) to two or more faces. Potentially each face having the same face key corresponds to the same individual. A group of faces having the same face key can be referred to as a bucket. Correlating also can include giving an image key to each face to identify the originating image for the face.

The possible correlations can be examined (454). Examining correlations can include comparing identifiers, such as face keys and image keys. Examination can result in discovering unlikely correlations. In some implementations, possible correlations can be generated on a per-image basis. Doing so can allow invalid or unlikely correlations to be eliminated before buckets are updated. Further, by performing the correlation process on a per-image basis, all matching scores for the faces included in an image can be generated and evaluated before the best match or matches are selected to form correlations. For example, the correlation scores for each potential match can be evaluated and the highest correlation score can be selected. Additionally, image keys can be evaluated before forming a correlation to verify that faces from different images are being correlated. As a result, the process can prevent forming a correlation between two or more faces included in one image and a single face included in a separate image.

Further, one or more forbidden associations can be identified. A forbidden association identifies two faces, e.g., faces included in the same source image, that never can be correlated. Additional forbidden associations also can be defined based on image metadata. For instance, an association between two images captured at substantially the same time and date can be forbidden where location metadata indicates that the images were not captured in substantially the same location. The forbidden associations can be identified automatically, manually, or both. Further, the forbidden associations can be stored using any data structure, including in a list or a record. A potential correlation can be compared with identified forbidden associations before being accepted by the system.

If it is determined that certain correlations are unlikely (456), the correlations can be eliminated (458). Elimination can include deleting the correlation from memory, associating the correlation with a suppression indication, or storing the correlation in a list of false positives. If it is determined that the correlations are not unlikely (456) or the unlikely correlations are eliminated (458), the process 450 ends. Furthermore, if a face belongs to a bucket (e.g., as assigned by a correlation system), but then is removed by a user, the remaining faces in the bucket may also be erroneously correlated and can, e.g., be reevaluated.

Figure 5:
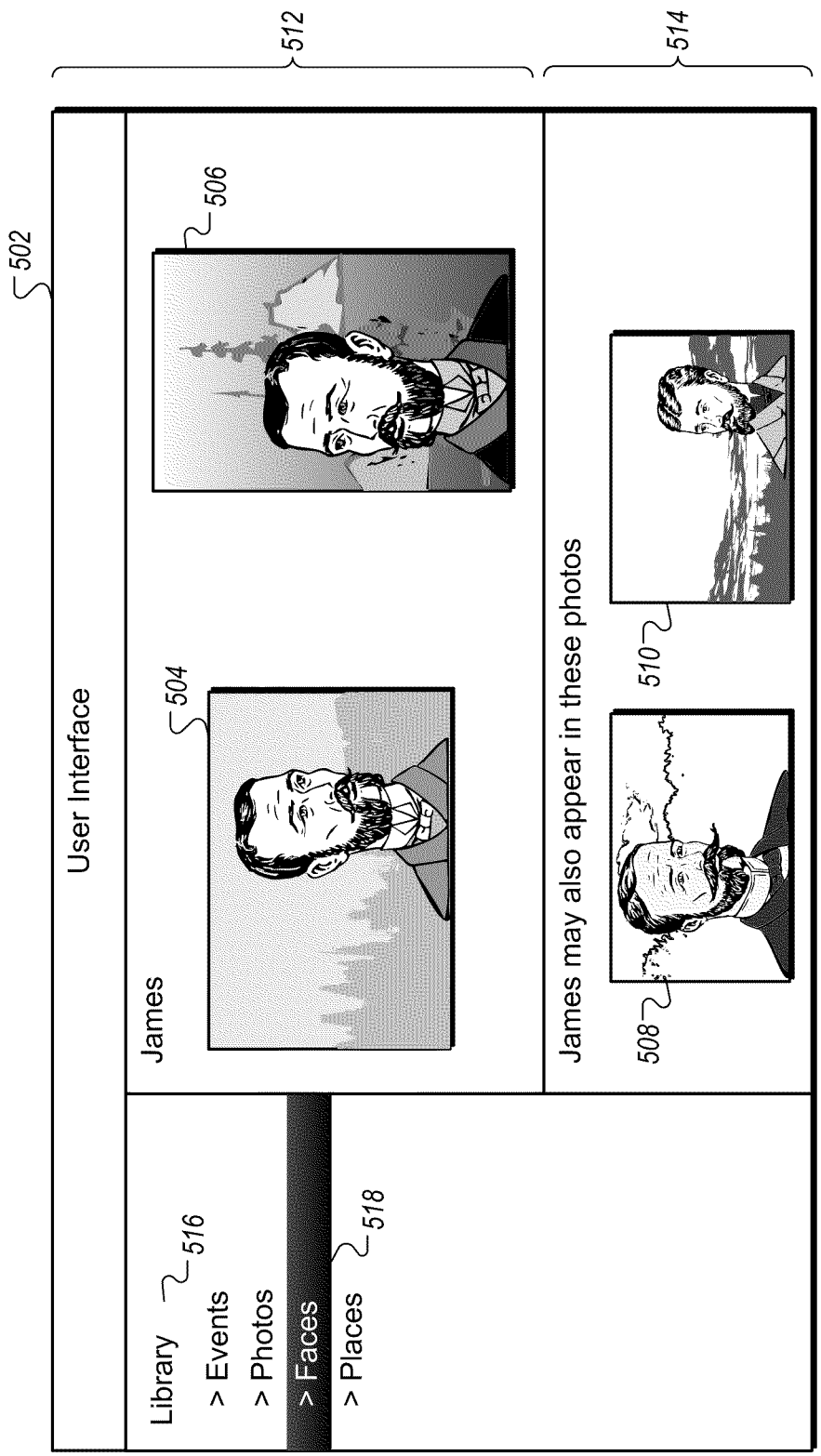
FIG. 5 is a diagram of an exemplary user interface for displaying correlated faces.

FIG. 5 is a diagram of an exemplary user interface 502 for displaying correlated faces. A user can provide information about the faces shown in one or more images displayed in the user interface 502. This positive identification provided by the user can be the basis of grouping images of one or more individuals. In addition, a correlation system can determine that other images for which the user has not provided information likely represent a known individual. Rather than adding the images to a group of positively identified images, the correlated images can be provided in a separate area of a user interface. Advantageously, the user can obtain the benefit of automatic correlation while at the same time not having to accept a correlation system's determinations.

The user interface 502 allows a user to receive information from a correlation system. The user interface 502 can include graphical, textual, and/or auditory information presented to the user, and the mechanism by which control sequences (e.g., keystrokes with the computer keyboard, movements of the computer mouse, and selections with the touchscreen) are received from the user. The user interface 502 can be a graphical user interface (GUI) and can accept input via devices such as a computer keyboard and a mouse, and can provide graphical output on one or more output devices, such as a computer display (e.g., liquid crystal display (LCD) monitor). The user interface 502 also can be a web-based user interface or a web user interface (WUI), and can accept input and provide output by generating web pages which are transmitted via the Internet and viewed by the user using a web browser. The user interface 502 also can be implemented to include a tactile interface that supplements or replaces other forms of output with haptic feedback. The user interface 502 also can be or can include a touch interface using a touchscreen display as a combined input and output device.

A menu 516 represented in the user interface 502 can provide a way for a user to access the face-display functionality of a correlation system. For example, a user can click the faces option 518 on the menu 516 and be presented with a list of individuals already available in the system (not shown). Further, the user can select an individual from the list of individuals to see images containing the individual's face. Also, when the faces option 518 is selected, the user interface can display one or more of the individuals represented in the system.

The face display area 512 of the user interface 502 can include one or more images associated with a given individual. The exemplary face display area 512 is associated with an individual named James and includes two images 504 and 506 corresponding to James. The area 512 can include zero (e.g., if a profile for an individual has been created but no corresponding images have been identified), one, or many images of an individual. Further, one or both of the images 504 and 506 can include faces that were positively identified by a user as James. In addition faces being positively identified by a user, the area 512 also can include faces identified by the correlation system without input from the user (e.g., faces identified by the system with a high degree of confidence).

The correlation display area 514 can include one or more images that the correlation system has determined likely represent the same individual displayed in the images included in the face display area 512. The user can positively identify one or more of the images as corresponding to James. The user also can simply leave system-identified images in the area 514 as a convenient way of seeing more images of an individual without having to positively identify each face in each image. This can allow significant time saving given that the user may have thousands of images on their computer. For example, image 508 can be an image of James that is displayed along with other images of James even though the user has never positively identified the face in the image 508 as corresponding to James. Alternatively, the image 510 can represent a face that is not James and the user can negatively identify the face as not being that of James. In this way, for correlation systems that make the majority of determinations correctly, a user can save additional time by positively identifying some faces and then subsequently only negatively identifying mismatched images.

The images for the correlation display area 514 can be selected using buckets. For example, if a face in a bucket is positively identified, the remaining faces in the bucket can be displayed in the correlation display area 514, since it is believed they correspond to the same individual.

FIG. 6A is a diagram of an exemplary user interface 602 for receiving user input. In general, a user interface can be provided that indicates both that the system has found a face in an image and that the system has potentially identified the person corresponding to the face.

The user interface 602 can display an image containing the face of a person 606. A marker 604, such as a rectangle or other such outline, can be used to indicate where in the image the face is believed to be. The user interface 602 can prompt a user to provide input through a dialogue box 608 confirming the identity of a person (e.g., James) or otherwise providing identifying information. In some implementations, the dialogue box 608 can include a "Yes" option 610 and "No" option 612 to allow the user to indicate whether the face belongs to James. The dialogue box 608, providing only confirmation options 610 and 612, can be provided when the correlation system is very confident about the identity of the person 606 shown. When the user selects one of the options 610 and 612, the correlation system can use the information (e.g., learn from it) to perform more accurate correlation in the future. The system also can reevaluate determinations already made based on the new information.

Figure 6B:
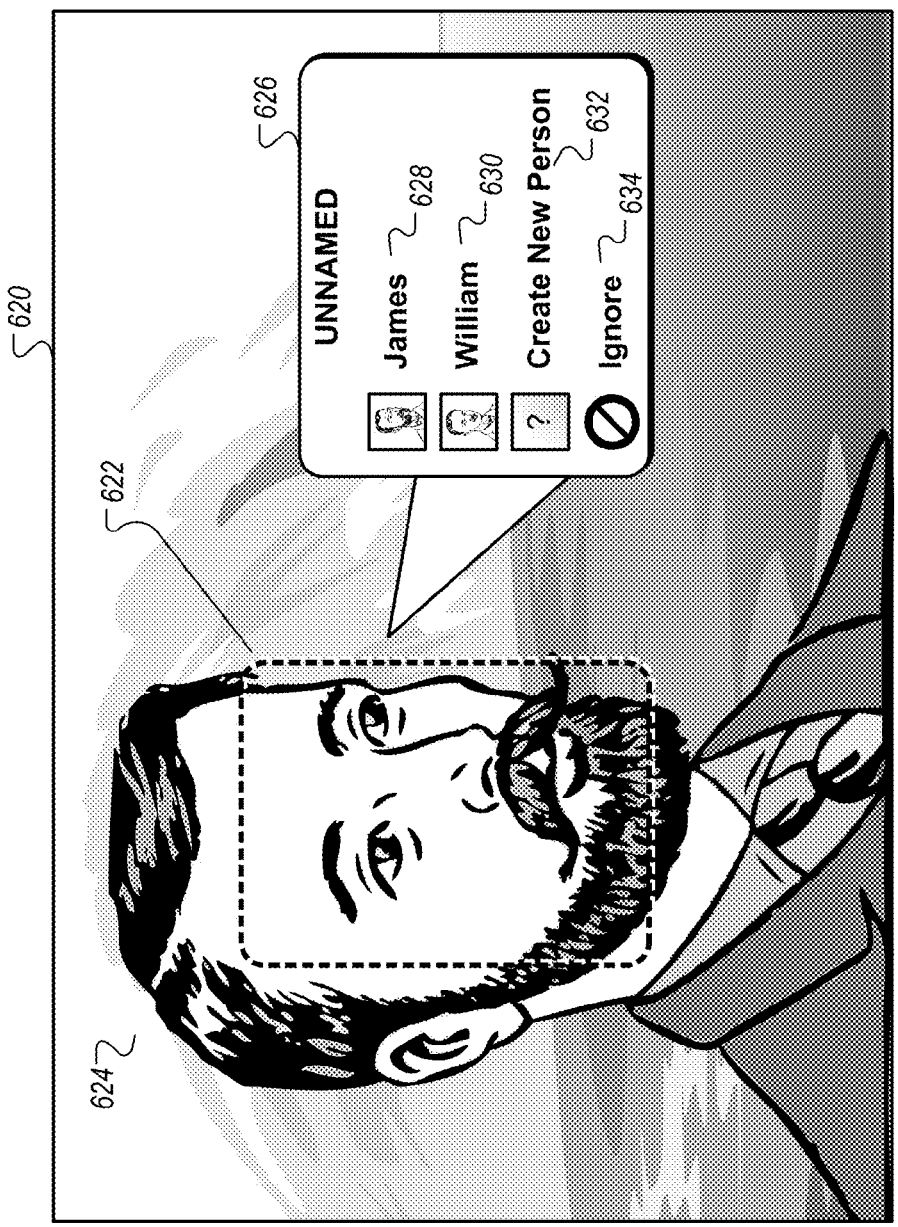
FIG. 6B is a diagram of an exemplary user interface for receiving user input.

FIG. 6B is a diagram of an exemplary user interface 620 for receiving user input. In general, the user interface can be configured to indicate that the system has found a face in an image and to suggest one or more potential identities of the face.

The user interface 620 can display an image containing the face of a person 624. A marker 622 can be used to indicate where in the image the face is believed to be located. The user interface 620 can request input from the user through a dialogue box 626 indicating that the face is not yet identified and suggesting the names of one or more potential matches in the system. For example, the dialogue box 626 can include a selectable "James" option 628 showing the name and a small thumbnail or other such icon associated with James. If the system also thinks the face could belong to William, a selectable William option 630 can be provided. If the person shown in the image is not yet identified in the system, a Create New Person option 632 can be provided. Upon selecting the Create New Person option 632, the user can enter the name of the individual corresponding to the image and any other information to create a profile that can be used subsequently to group images. The dialogue box 608 also can include an Ignore option 634 in case the user does not want to provide input corresponding to the represented individual.

Figure 6C:
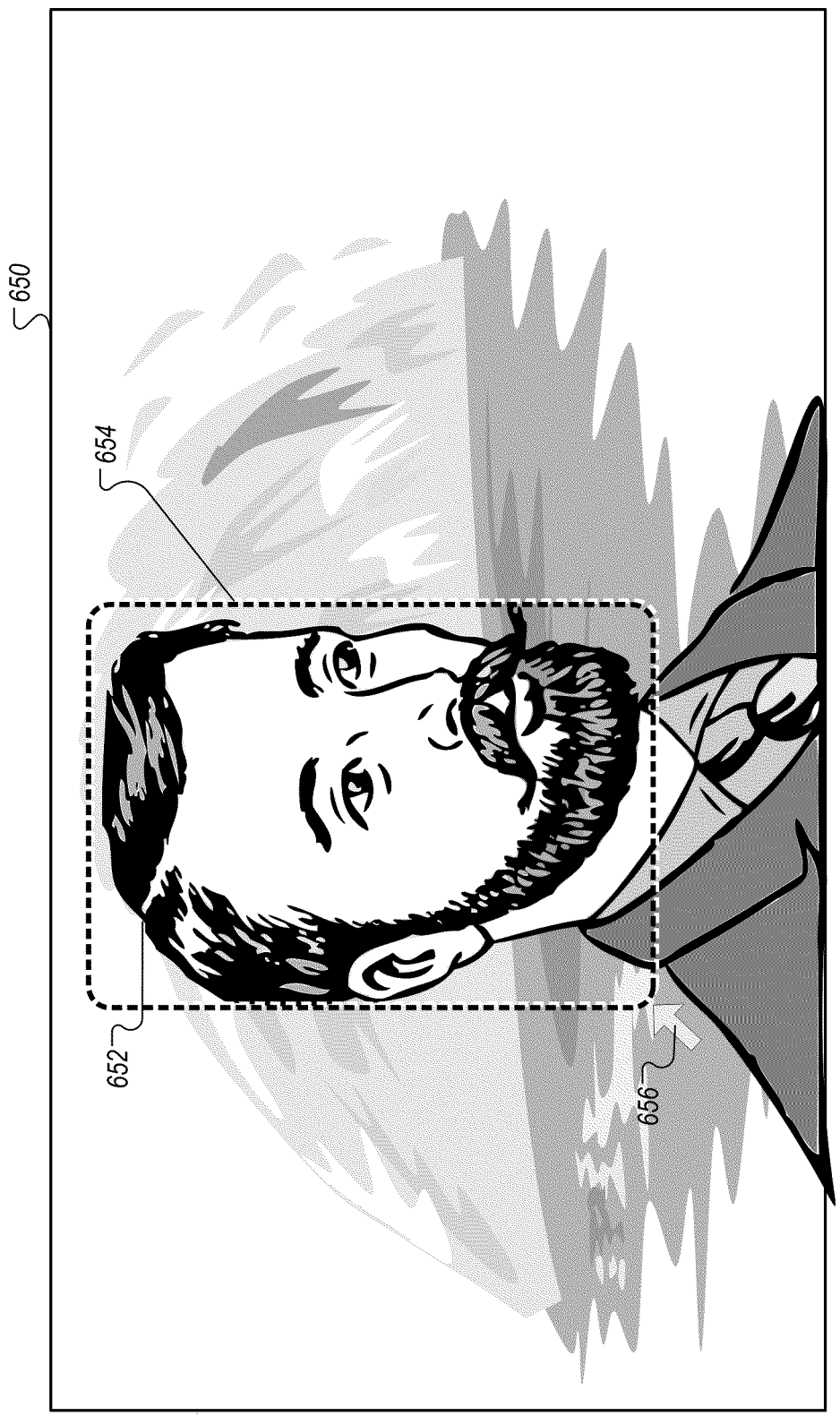
FIG. 6C is a diagram of an exemplary user interface for receiving user input identifying a face location.

FIG. 6C is a diagram of an exemplary user interface for receiving user input identifying a face location. One or more criteria can be used to perform facial detection. For some images, the value corresponding to the one or more criteria that will produce a positive detection is too high and an included face in the image is not automatically detected. If a face is not detected in an image, a user can provide manual input identifying a portion of the image in which a face is represented.

For example, a user interface 650 can be configured to present an image in which a face 652 is represented but not automatically detected. The image can be presented in the user interface 650 in response to manual selection by a user or can be presented automatically if no faces are detected in the image during processing. User input identifying the face location can be received through an on-screen control device, e.g., cursor 656, in the user interface 650. For example, cursor 656 can be used to place a boundary, e.g. rectangle 654, around the portion of the image that includes the undetected face. In some implementations, the boundary can be associated with the image through other means, such as a touch screen or the entry of one or more coordinates and/or dimensions.

Once the boundary has been associated with the image, a facial detection process can be performed with respect only to the image portion contained within the boundary. Because the face was not detected using the previously defined, or default, facial detection criteria, one or more of the criteria can be adjusted to more readily produce a positive facial detection. For example, one or more of a sharpness threshold, a skin-tone threshold, and a range of head-tilt angles can be relaxed. In some implementations, facial detection criteria can be iteratively adjusted until a positive facial detection is made in the user-specified portion of the image. In some other implementations, one or more threshold values can be entirely removed. When a face is detected within the user-specified portion of the image, the user can be prompted to confirm that the face was properly detected.

Figure 6D:
FIG. 6D is a diagram of an exemplary user interface for receiving user input to associate a name with a face.

FIG. 6D is a diagram of an exemplary user interface 672 for receiving user input to associate a name with a face. In general, the user interface 672 can be configured to receive input regarding the identity of a face. The user interface 672 can display an image containing the face of a person 676. The face can be located in the image by a correlation system or by a user.

A marker 674 can be used to indicate a particular face in an image. The marker 674 can distinguish a face from other faces when an image represents multiple faces. A user can dismiss the marker 674 by clicking on an icon or command mechanism, such as the X 680 associated with the marker 674. A user may wish, for example, to dismiss a marker 674 when the system incorrectly identifies something as a face that does not actually represent a face.

The user interface 672 can request input from the user through a dialogue box 678. For example, the system can request input when an individual is unknown to the system. When a user begins typing in text box 682, the system can provide an options menu 684 listing people in the system matching what the user has typed. For example, if the user types "ja" into the text box 682, the system can provide an options menu 684 listing "Jack" and "James" since both names match the "ja" type by the user. The user can then click on one of the names, such as the name Jack 686, to identify the person 676 by the name. The dialog box 678 can be dismissed, e.g., without the user entering a name by the user clicking the X 680 associated with the face marker 674. The dialog box 678 also can include an icon or a command entry mechanism for being dismissed, such as an X in the upper right corner (not shown).

Figure 7:
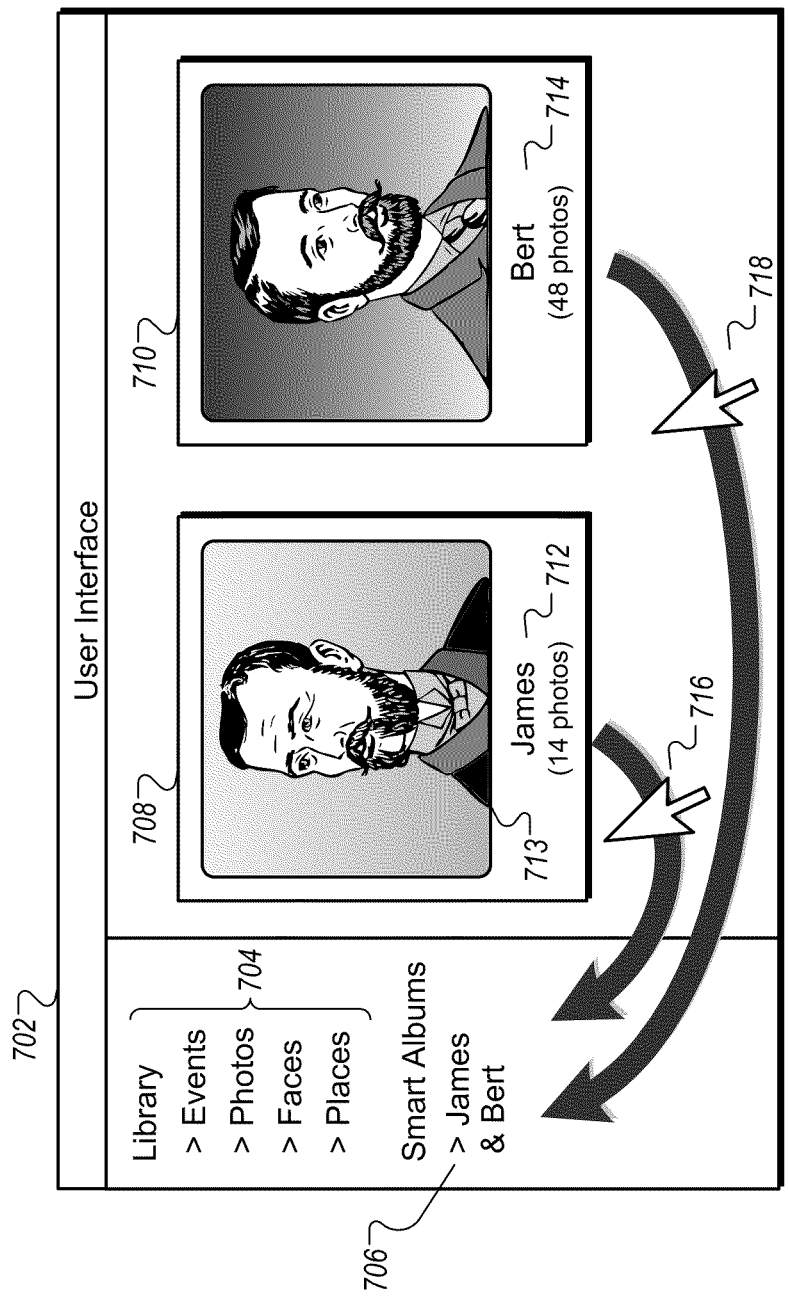
FIG. 7 is a diagram of an exemplary user interface for creating albums.

FIG. 7 is a diagram of an exemplary user interface 702 for creating one or more albums. An albums can be a group of images based on a theme, such as a particular individual or group of individuals. For example, a parent can make an album of images showing both of her children (i.e., an "and" album). Thus, each image in the album represents both children. The parent also can make an album of images showing either of her two children (i.e., an "or" album). Thus, each image in the album represents at least one of the two children.

The user interface 702 can include a menu 704 configured to allow a user to navigate within the user interface 702. The user interface 702 also can include one or more individuals, such as the two identified individuals 708 and 710. A James album 708 is shown with information 712 providing his name, "James," and the number of images (e.g., photos) contained in the album 708, i.e., photos 14. A cover image 713 for the James album 708 also can be displayed. The cover image can be selected by a user or can be automatically selected based on one or more criteria, such as the image quality of the detected face or the number of times the image has been viewed. A Bert album 710 is similarly shown with information 714 providing his name and the number of images (e.g., photos) contained in the album 710.

In operation, to create a new smart album that includes images from both the James album 708 and the Bert album 710, a user can drag 716 the James album 708 to the Smart Albums area 706 of the menu and drop the James album 708. The user also can drag 718 the Bert album 710 to the Smart Albums area 706 and drop the Bert album 710 there as well. By dragging both albums 708 and 710, the system can create either an album of pictures including both people together or an album of pictures including either person. When an album associated with a named individual is dropped in the Smart Albums area 706, one type of album or the other can be created by default. Alternatively, the user can be prompted to choose the type of album to be created. Any number of albums can be combined to create a Smart Album.

Figure 8:
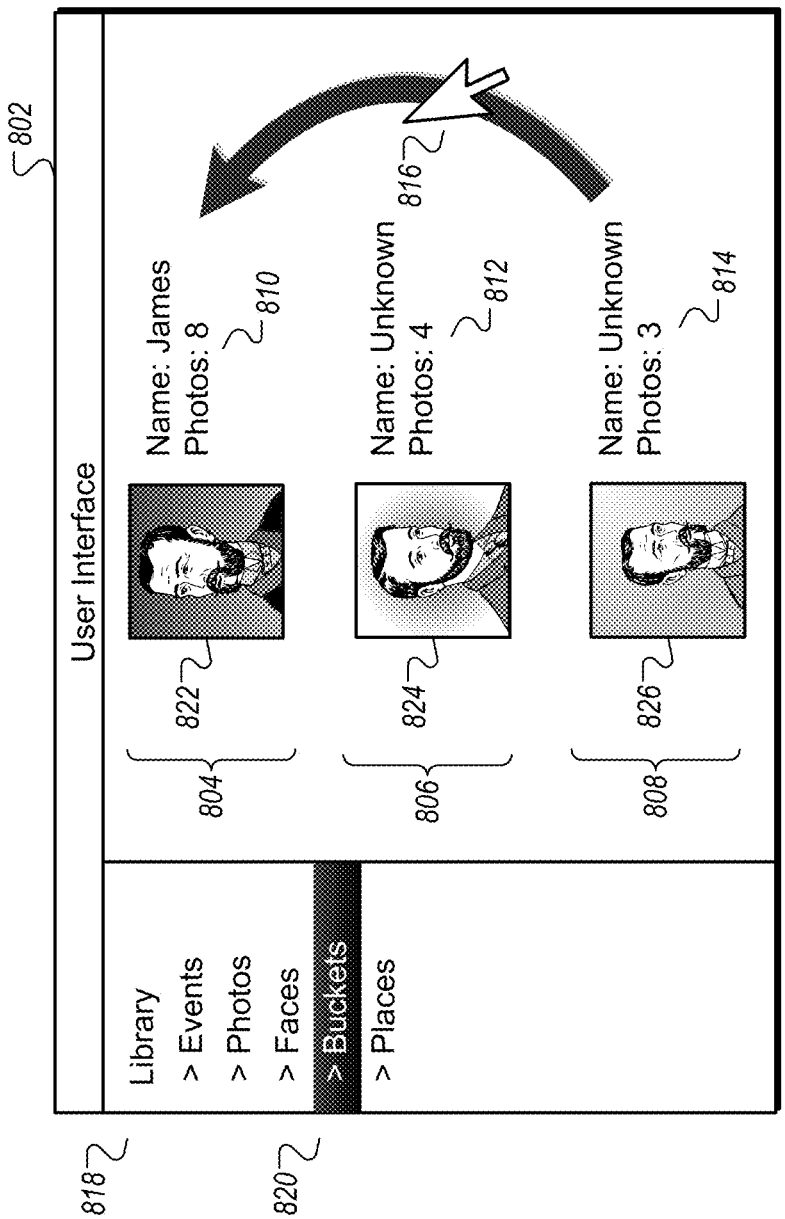
FIG. 8 is a diagram of an exemplary user interface for receiving user input.

FIG. 8 is a diagram of an exemplary user interface 802 for receiving user input. In general, a correlation system can group images believed to represent the same person together into a single bucket. A user interface 802 can be provided for modifying the buckets, such as to combined two buckets that each contain images of the same person. Some implementations include the bucket concept shown in FIG. 8 but do not include a user interface (e.g., the user interface 802) for modifying or otherwise interacting with buckets.

The user interface 802 can include a menu 818 for navigating the user interface 802. Selecting the buckets option 820 in the menu 818 can cause an interface 802 for modifying one or more buckets to be displayed. For example, a correlation process can generate three buckets 804, 806, and 808. A user may have identified the first bucket 804 as having images of a particular person (e.g., James). The interface 802 can display information 810 about the named individual such as his or her name and the number of images (e.g., photos) in the first bucket 804. The first bucket 804 also can include an icon 822 displaying the individual. Similarly, the interface 802 can display an icon 824 and information 812 corresponding to the second bucket 806 and an icon 826 and information 814 corresponding to the third bucket 808.

In operation, a user can drag 816 a bucket, e.g., the third bucket 808, to another bucket, such as the first bucket 804, to merge the buckets. In addition to consolidating two groups of images, merging the first bucket 804 with the third bucket 808 also can provide additional information to the system. For example, the system can refine recognition criteria associated with James based on the additional images contained in the third bucket 808. If two buckets are named inconsistently, standard merging rules can be employed (e.g., requiring the user to choose which name is correct for the resulting merged bucket). Alternatively, the information corresponding to one of the buckets, e.g., the destination bucket, can be used for the merged bucket.

Figure 9:
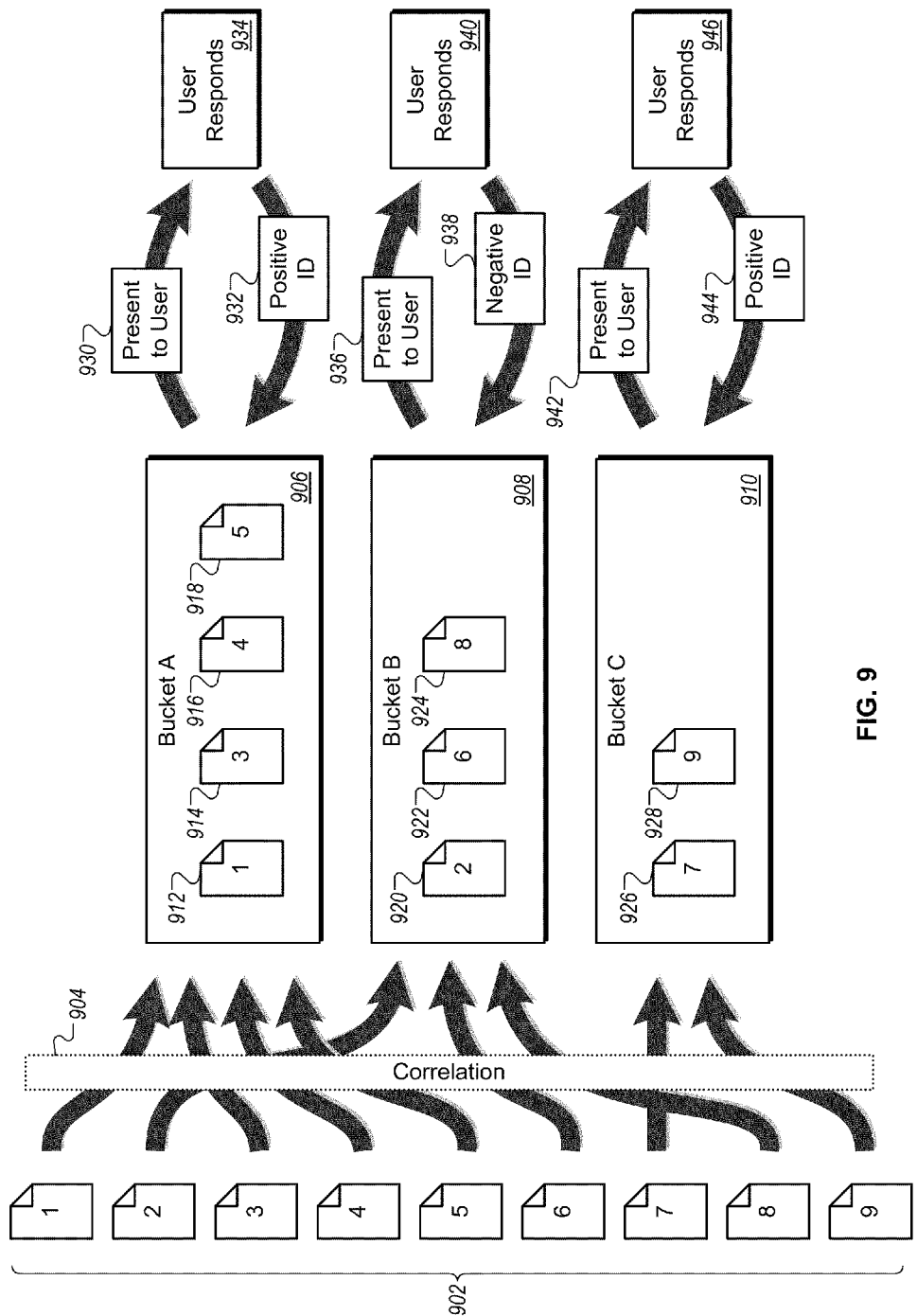
FIG. 9 is a diagram showing exemplary correlation techniques.

FIG. 9 is a diagram showing exemplary correlation techniques. By grouping images in buckets, a correlation system can use inductive reasoning to make determinations about the bucket as a whole from information known about individual members of the bucket.

A group of images 902 can be processed by a correlation system. The group of images 902 can represent the faces of individuals. During the correlation process 904, the group of images 902 can be divided and assigned to buckets, such as buckets 906, 908 or 910. Each image of the group of images 902 can be assigned to at least one bucket. Potentially, one or more of the group of images 902 could be assigned to multiple buckets (e.g., if an image represents two or more people).

After correlation 904, Bucket A 906 includes image 1 912, image 3 914, image 4 916, and image 5 918. Each of the images represents, based on a threshold confidence level, the face of the same individual. Further, Bucket B 908 includes image 2 920, image 6 922, and image 8 924. Additionally, Bucket C 910 includes image 7 926 and image 9 928. In some implementations, each of the buckets 906, 908, and 910 can be created based on the same correlation criteria. In other implementations, one or more criteria can vary between buckets.

In operation, the correlation system can present 930 to the user an image, such as image 1 912. The user can request to see image 1 912 or can be prompted with the image 1 912.

Once image 1 912 has been presented, the user can respond 934. Responding can include, for example, clicking on an option in a dialog box presented to the user through a user interface (e.g., the dialog box 626 shown in FIG. 6B). Responding also can include a positive identification (ID) 932 of the face in image 1 912. The positive ID 932 can then be used to determine, e.g., that image 3 914 is of the same individual. Thus, based on the established confidence level, identification of one image in a bucket can be used to identify each of the remaining images in that bucket. Similarly, the correlation system can present 942 to the user image 7 926. The user can respond 946 and provide a positive ID 944 of the face in image 7 926. The positive ID 944 can then be used to determine, e.g., that image 9 928 is of the same individual whose identity was confirmed in the identification 944.

Further, the correlation system can present 936 to the user image 2 920. The user can respond 940 and provide a negative ID 938 indicating that the face in image 2 920 is not of a particular individual. In some implementations, the negative ID 938 can be used to determine, e.g., that image 6 922 also is not of the individual identified 938, since image 2 920 and image 6 922 are correlated.

The correlation system also can combine one or both of the positive and negative information provided by the user to make further determinations. For example, if the positive IDs 932 and 944 are for the same individual, it can be determined that image 9 928 and image 3 914 are potentially the same individual. In addition, if the negative ID 938 is for the same individual as the positive ID 932, it can be determined that image 6 922 is likely not the same individual shown in image 3 914.

Figure 10:
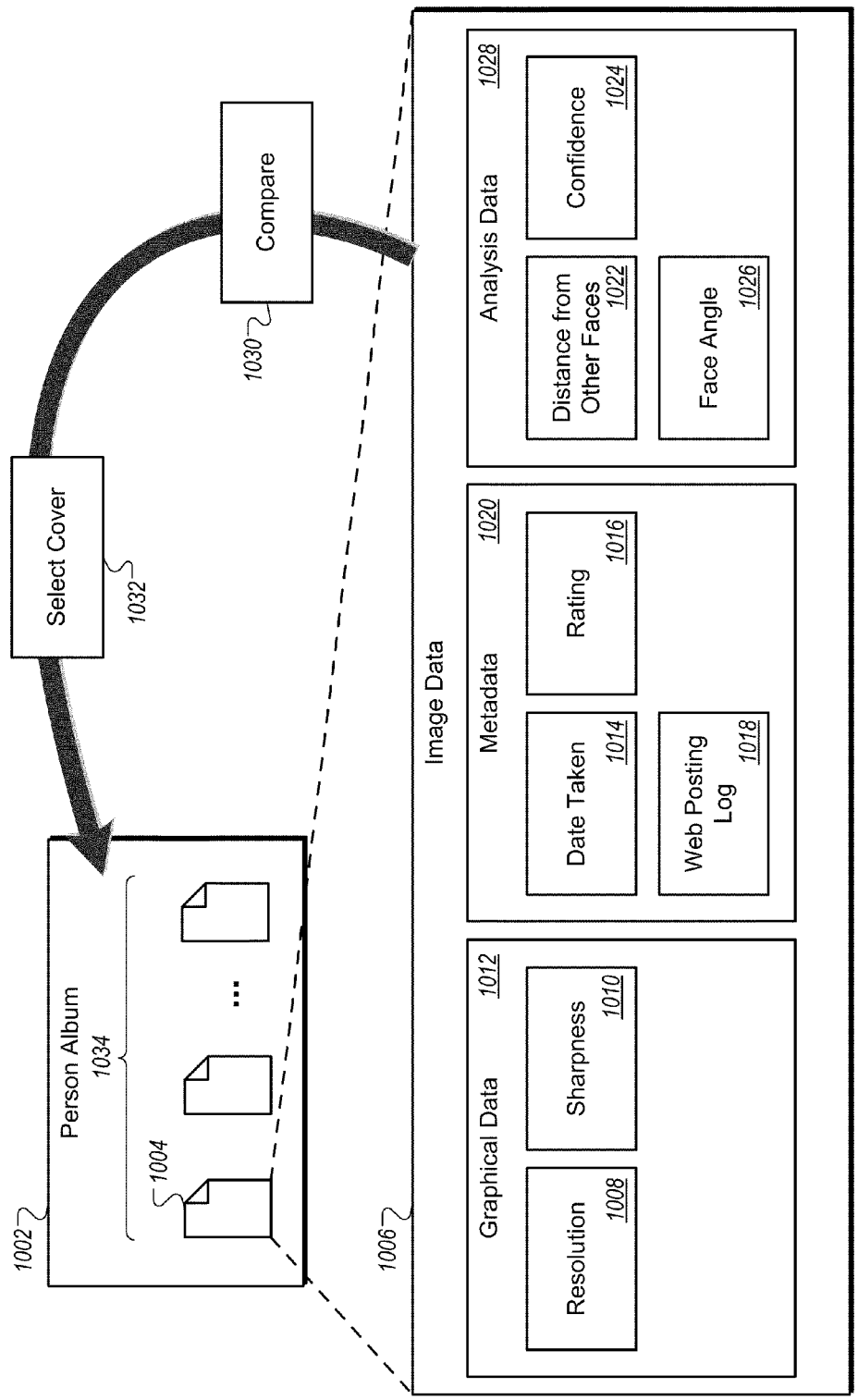
FIG. 10 is a diagram showing selection of an album cover.

FIG. 10 is a diagram showing selection of an album cover. An albums can be a group of images based on a theme. For example, a named individual can have an album 1002 of all images 1034 of the individual. A user can select one of the images 1004 from the album to be the cover (e.g., the image used to graphically identify the album). Alternatively, the album cover can be automatically selected from the album 1002, such as the first image.

Further, a cover image also can be automatically cropped to emphasize the face of the individual associated with the album. In some implementations, the image can be cropped such that the portion in which the face was detected is used as the cover image. Further, the image can be cropped such that the detected face is located approximately in the center of the cropped portion. In some other implementations, additional logic can be applied to a crop procedure. For example, the portion of the image in which the face was detected can be cropped in accordance with the dimensions and/or orientation, e.g., landscape or portrait, of the cover image. Further, the image can be cropped to show more of the person corresponding to the detected face. For example, the image can be cropped based on one or more features, e.g., the eyes, such that the face occupies the upper portion of the cropped image and more of the person's body is displayed than the space above the person's head.

In operation, a cover can be selected using information known about the images 1034 in an album 1002. For example, image 1004 can include image data 1006. There can be multiple types of image data 1006, such as graphical data 1012, metadata 1020, and analysis data 1028. The graphical data 1012 can include, e.g., the resolution 1008 of the image and sharpness 1010 of the face represented in the image. A higher resolution image can look better than a low resolution image. Similarly, a sharp (e.g., in focus) face can look better than a blurry face.

The metadata 1020 can include the date the image was taken 1014, a rating 1016, and a log of web posting 1018. The date 1014 can be used to determine if the image is relatively recent, both temporally and relative to other images in the album. The rating 1016 can be a rating indicating a valuation of the image provided by one or more users. The web posting log 1018 can include information about, e.g., the user uploading the image to a social network website, which can, in turn, indicate that the user thinks more highly of the image.

The analysis data 1028 can include the distance 1022 from other faces also in the image 1004, confidence 1024 (e.g., of the recognition or detection), and the face angle 1026. The distance 1022 can be helpful if a face is to be automatically cropped for the cover. If a face if very close to one or more other faces, automatic cropping can result in a portion of someone else's face being represented in the cover or the subject's face being too tightly cropped. The confidence 1024 can indicate how likely it is that a face actually corresponds to the subject in question. Thus, the album cover can be an image determined by the correlation system to represent the face of the subject rather than a face which was positively identified by the user. In addition, even when the image has been positively identified by a user, the confidence 1024 can help determine if an image is representative of the individual by assessing how closely correlated the image is to others in the album 1002. Additionally, the face angle 1026 can be used to help select, e.g., a face that is directly facing the viewer rather a profile.

The various images 1034 in the album can be compared 1030 using, e.g., the components of the image data for each of the images. Based on the comparison 1030, a cover can be selected 1032 that is visually appealing and representative of the group of images 1034.

Implementations of the subject matter and functional operations described in this specification can be implemented in electronic circuitry, computer software, firmware, or hardware, or in combinations or equivalents thereof. The subject matter can be implemented as one or more computer program products, such as one or more computer programs tangibly embodied in a device or medium, including a machine-readable storage device, or a machine-readable storage medium. Machine-readable includes optically readable, such as involving optically readable physical marks made on a substrate that are readable with the aid of light. Machine-readable also includes magnetically interpretable storage or recording involving physical patterns made in a magnetizable material. Computer program products can be used for execution by, or to control the operation of data processing apparatus, including one or more processors, or computers. The data processing apparatus can include any of hardware, processor firmware, a protocol stack, a database management system, and an operating system.

A computer program (also known as a program, software, software application, or code) can be written a programming language, including compiled or interpreted languages, and deployed in various forms, including as a stand-alone program or as a module, component, subroutine, or other unit suitable for use in a computing environment. A computer program does not necessarily correspond to a file. A computer program can be stored in a portion of a file that holds other programs or data, in a single file dedicated to the program in question, or in multiple coordinated files (e.g., files that store one or more modules, sub-programs, or portions of code). A computer program can be executed on one computer or on multiple computers at one site or distributed across multiple sites and interconnected by a communication network, such as a network or internetwork of networks (e.g., the Internet).

The processes and logic flows described in this specification can be performed by computer program products operating on input data and generating output. Processors suitable for the execution of a computer program product include general and special purpose microprocessors, and one or more computer processors. A processor can receive, retrieve and execute instructions and data from read-only memory, random access memory or both.

A computer can include a processor for executing instructions and one or more memory devices for storing instructions and data. A computer also can include, or be operatively coupled to receive data from or transfer data to, or both, one or more mass storage devices for storing data, e.g., magnetic, magneto-optical disks, or optical disks. A computer can be embedded in another device, such as a mobile telephone, a digital camera, a digital scanner, a digital video recorder, a personal digital assistant (PDA), a mobile audio player, or a Global Positioning System (GPS) receiver. Machine-readable storage devices or storage media suitable for embodying computer program instructions and data can include non-volatile memory, such as semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

User interaction can be implemented on a computer or other device having a display device, e.g., a CRT (cathode ray tube) or LCD (liquid crystal display) monitor, for displaying information to the user, and any form of input device, e.g., keyboard and a pointing device, e.g., a mouse or a trackball, by use of which the user can provide input. Other kinds of devices can be used to provide for interaction with a user as well; for example, feedback provided to the user can be any form of sensory feedback, e.g., visual feedback, auditory feedback, or haptic feedback; and input from the user can be received in any form, including acoustic, speech, or haptic input.

A number of implementations have been disclosed herein. Nevertheless, it will be understood that various modifications may be made without departing from the spirit and scope of the claims. Accordingly, other implementations are within the scope of the following claims.

What is claimed is:

1. A computer program product, encoded on a non-transitory computer-readable medium, operable to cause data processing apparatus to perform operations comprising:

generating a correlation value indicating a likelihood that a face included in a test image corresponds to a face associated with a pre-determined base image;

determining that a correlation threshold exceeds the correlation value and that the correlation value exceeds a non-correlation threshold;

confirming that an elapsed time between the base image and the test image is below a time threshold;

generating a similarity score based on one or more exposure values and one or more color distribution values corresponding to the test image and the base image;

combining the similarity score with the correlation value to generate a weighted correlation value; and determining that the test image and the base image are correlated when the weighted correlation value exceeds the correlation threshold.

2. The computer program product of claim 1, further operable to cause data processing apparatus to perform operations comprising:

determining the elapsed time based on time and date metadata associated with the base image and the test image.

3. The computer program product of claim 1, further operable to cause data processing apparatus to perform operations comprising:

applying a weighting factor to at least one of the one or more exposure values and one or more color distribution values.

4. The computer program product of claim 1, further operable to cause data processing apparatus to perform operations comprising:

adjusting the correlation threshold based on one or more previous correlation operations.

5. The computer program product of claim 1, further operable to cause data processing apparatus to perform operations comprising:

determining that the base image and the test image include multiple faces; and computing a color distribution comparison between a corresponding face region of the base image and the test image for use in generating the similarity score.

6. The computer program product of claim 1, further operable to cause data processing apparatus to perform operations comprising:

determining that a correlation between the base image and the test image represents a forbidden association; and prohibiting the correlation.

* * * * *